US006876601B2

(12) United States Patent
Li et al.

(10) Patent No.: US 6,876,601 B2
(45) Date of Patent: Apr. 5, 2005

(54) TIMER FACILITY FOR A STACK OR OPERATING SYSTEM

(75) Inventors: Qing Li, San Jose, CA (US); Dietmar Eggemann, San Francisco, CA (US)

(73) Assignee: Wind River Systems, Inc., Alameda, CA (US)

( * ) Notice: Subject to any disclaimer, the term of this patent is extended or adjusted under 35 U.S.C. 154(b) by 398 days.

(21) Appl. No.: 10/225,520

(22) Filed: Aug. 21, 2002

(65) Prior Publication Data

US 2004/0037170 A1 Feb. 26, 2004

(51) Int. Cl.[7] .............................. G04F 8/00; G04F 10/00; G06F 13/00
(52) U.S. Cl. ........................ 368/113; 713/500; 713/501; 713/502
(58) Field of Search ................................. 368/113, 118, 368/120; 713/500–503; 377/20

(56) References Cited

U.S. PATENT DOCUMENTS

| | | | | |
|---|---|---|---|---|
| 4,942,559 A | * | 7/1990 | Fleck et al. | 368/113 |
| 5,138,707 A | * | 8/1992 | Haller et al. | 713/500 |
| 5,577,238 A | * | 11/1996 | Cuny et al. | 713/500 |
| 5,805,532 A | * | 9/1998 | Murakami | 368/113 |
| 6,552,965 B2 | * | 4/2003 | Brandt et al. | 368/107 |

OTHER PUBLICATIONS

G. Varghese et al., "Hashed and Hierarchical Timing Wheels: Efficient Data Structures for Implementing a Timer Facility", IEEE/ACM Transactions on Networking, vol. 5, No. 6, Dec. 1997, pp. 824–834.

* cited by examiner

Primary Examiner—Vit W. Miska
(74) Attorney, Agent, or Firm—Fay Kaplun & Marcin, LLP

(57) ABSTRACT

A method, comprising the steps of receiving a timeout setting, determining a selected timer unit of one of a first timer unit and a second timer unit, wherein a first set of slots is included in the first timer unit and a second set of slots is included in the second timer unit. The selected one of the timer units being determined by determining a maximum time period of the first timer unit based on a number of slots in the first set of slots and a granularity which defines a relationship between each slot in the first set of slots, comparing the timeout setting to the maximum time period of the first timer unit, and incrementing to the second timer unit if the timeout setting is greater than the maximum time period of the first timer unit. Determining one of the first slots and the second slots into which the timeout setting is to be inserted and inserting the timeout setting into the one of the slots.

20 Claims, 11 Drawing Sheets

| Timer unit u | Smallest timeout $t_s$ [Tick] | Largest timeout $t_l$ [Tick] | Granularity r [Tick] | Max error $e_{max}$ [Tick] | Max error (reduced) $e_{maxu}$ [Tick] |
|---|---|---|---|---|---|
| 0 | 1 | 127 | 1 | 0 | 0 |
| 1 | 128 | 508 | 4 | -3 | 2 |
| 2 | 509 | 2032 | 16 | -15 | 8 |
| 3 | 2033 | 8128 | 64 | -63 | 32 |

Fig. 2

| Value | 4096 | 2048 | 1024 | 512 | 256 | 128 | 64 | 32 | 16 | 8 | 4 | 2 | 1 |
|---|---|---|---|---|---|---|---|---|---|---|---|---|---|
| 127 | | | | | | | 1 | 1 | 1 | 1 | 1 | 1 | 1 |
| 508 | | | | 1 | 1 | 1 | 1 | 1 | 1 | 1 | 1 | 0 | 0 |
| 2032 | | 1 | 1 | 1 | 1 | 1 | 1 | 1 | 1 | 0 | 0 | 0 | 0 |
| 8128 | 1 | 1 | 1 | 1 | 1 | 1 | 1 | 0 | 0 | 0 | 0 | 0 | 0 |

Fig. 5

| Value | 512 | 256 | 128 | 64 | 32 | 16 | 8 | 4 | 2 | 1 |
|---|---|---|---|---|---|---|---|---|---|---|
| 560 | 1 | 0 | 0 | 1 | 1 | 1 | 0 | 0 | 0 | 0 |
| 35 | | | | | 1 | 0 | 0 | 0 | 1 | 1 |

Fig. 7

| Value | 128 | 64 | 32 | 16 | 8 | 4 | 2 | 1 |
|---|---|---|---|---|---|---|---|---|
| 196 | 1 | 1 | 0 | 0 | 0 | 1 | 2 | 1 |
| 197 | 1 | 1 | 0 | 0 | 0 | 1 | 0 | 0 |
| 198 | 1 | 1 | 0 | 0 | 0 | 1 | 0 | 1 |
| 199 | 1 | 1 | 0 | 0 | 0 | 1 | 1 | 0 |
| 49 |  |  | 1 | 1 | 0 | 0 | 0 | 1 |

Fig. 8

| Value | 128 | 64 | 32 | 16 | 8 | 4 | 2 | 1 |
|---|---|---|---|---|---|---|---|---|
| 100 | 0 | 1 | 1 | 0 | 0 | 1 | 0 | 0 |
| 50 | 0 | 0 | 1 | 1 | 0 | 0 | 1 | 0 |
| 150 | 1 | 0 | 0 | 1 | 0 | 1 | 1 | 0 |
| 127 | 0 | 1 | 1 | 1 | 1 | 1 | 1 | 1 |
| 23 | 0 | 0 | 0 | 1 | 0 | 1 | 1 | 1 |

|  | Timer (0) 10 | Timer (1) 20 | Timer (2) 30 | |
|---|---|---|---|---|
| Counter=1 | 00001 | 00001 | 00001 | — 360 |
| Mask | 0 | 11 | 1111 | — 362 |
| Result | 0 | 01 | 0001 | — 364 |

Fig. 10a

|  | Timer (0) 10 | Timer (1) 20 | Timer (2) 30 | |
|---|---|---|---|---|
| Counter=4 | 00100 | 00100 | 00100 | — 370 |
| Mask | 0 | 11 | 1111 | — 372 |
| Result | 0 | 00 | 0100 | — 374 |

Fig. 10b

|  | Timer (0) 10 | Timer (1) 20 | Timer (2) 30 | |
|---|---|---|---|---|
| Counter=5 | 00101 | 00101 | 00101 | — 380 |
| Mask | 0 | 11 | 1111 | — 382 |
| Result | 0 | 01 | 0101 | — 384 |

Fig. 10c

|  | Timer (0) 10 | Timer (1) 20 | Timer (2) 30 | |
|---|---|---|---|---|
| Counter=16 | 10000 | 10000 | 10000 | — 390 |
| Mask | 0 | 11 | 1111 | — 392 |
| Result | 0 | 00 | 0000 | — 394 |

Fig. 10d

TIMER FACILITY FOR A STACK OR OPERATING SYSTEM

BACKGROUND INFORMATION

Operating systems for devices such as personal computers ("PCs"), personal digital assistants ("PDAs"), embedded devices, etc., contain timer facilities that implement various timer algorithms. The purpose of the timer facilities is to simply keep track of the amount of time that has expired since the occurrence of a specified event. Many applications running on the devices contain algorithms in which the notion of time or relative time is integral to the function of the application. Examples of such algorithms include scheduling algorithms, algorithms which control packet lifetimes in computer networks and process control algorithms. Other functions for which time is important may include failure recovery and alarm status. These applications may use the operating system timer facility for these algorithms.

Current timer facilities add a significant amount of overhead to the device when it is running. This overhead may result from the need to perform multiplication or division in order to keep track of the time. In addition, the timer facilities may require the use of a math coprocessor which may not be available in every device. Real time systems may implement numerous alarms, for example, a typical real time network communication protocol may have thousands of alarm settings for the various communications it is handling. Each of these alarm settings may have a separate instance of the timer facility to keep track of the time that has elapsed since an event that is important for that particular alarm. Thus, the device hardware (e.g., processor, random access memory ("RAM"), etc.) is burdened with the numerous instances of the high overhead timer facilities leading to lower overall performance levels for the device.

SUMMARY OF THE INVENTION

A method, comprising the steps of receiving a timeout setting, determining a selected timer unit of one of a first timer unit and a second timer unit, wherein a first set of slots is included in the first timer unit and a second set of slots is included in the second timer unit. The selected one of the timer units being determined by determining a maximum time period of the first timer unit based on a number of slots in the first set of slots and a granularity which defines a relationship between each slot in the first set of slots, comparing the timeout setting to the maximum time period of the first timer unit, and incrementing to the second timer unit if the timeout setting is greater than the maximum time period of the first timer unit. Determining one of the first slots and the second slots into which the timeout setting is to be inserted and inserting the timeout setting into the one of the slots.

A system, comprising a first timer unit including a first plurality of slots, each slot representing a time period, a second timer unit including a second plurality of slots, each slot representing a time period, wherein the first plurality of slots represent a first range of time periods and the second plurality of slots represent a second range of time periods, the first range being determined based on a number of slots in the first timer unit and a first granularity which defines a relationship between the first plurality of slots, the second range being determined based on a number of slots in the second timer unit and a second granularity which defines a relationship between the second plurality of slots. The system further including a timer logic module configured to receive counter information from a counter incrementing at predetermined time intervals, and update at least one of the slots when the counter information corresponds to the time period represented by the at least one slot.

Furthermore, a system, comprising a first timer unit including a first plurality of slots, each slot representing a time period and a second timer unit including a second plurality of slots, each slot representing a time period, wherein the first plurality of slots represent a first range of time periods and the second plurality of slots represent a second range of time periods, the first range being determined based on a number of slots in the first timer unit and a first granularity which defines a relationship between the first plurality of slots, the second range being determined based on a number of slots in the second timer unit and a second granularity which defines a relationship between the second plurality of slots, wherein the first range and the second range are related based on a ratio between the first granularity and the second granularity.

BRIEF DESCRIPTION OF DRAWINGS

FIG. 2 shows an exemplary table showing an exemplary configuration for the timer facility according to the present invention;

FIG. 5 shows a table with the binary representations of a series of numbers representing the left binary shifting operation according to the present invention;

FIG. 7 shows a second exemplary right binary shifting operation according to the present invention;

FIG. 8 shows a third example of a right binary shifting operation according to the present invention;

FIG. 9 shows exemplary binary addition and subtraction operations to determine a slot location for timeout setting according to the present invention;

FIGS. 10a–d show exemplary binary mod operations used to determine whether to update the current slot of a timer unit according to the present invention;

DETAILED DESCRIPTION

Figure 1:
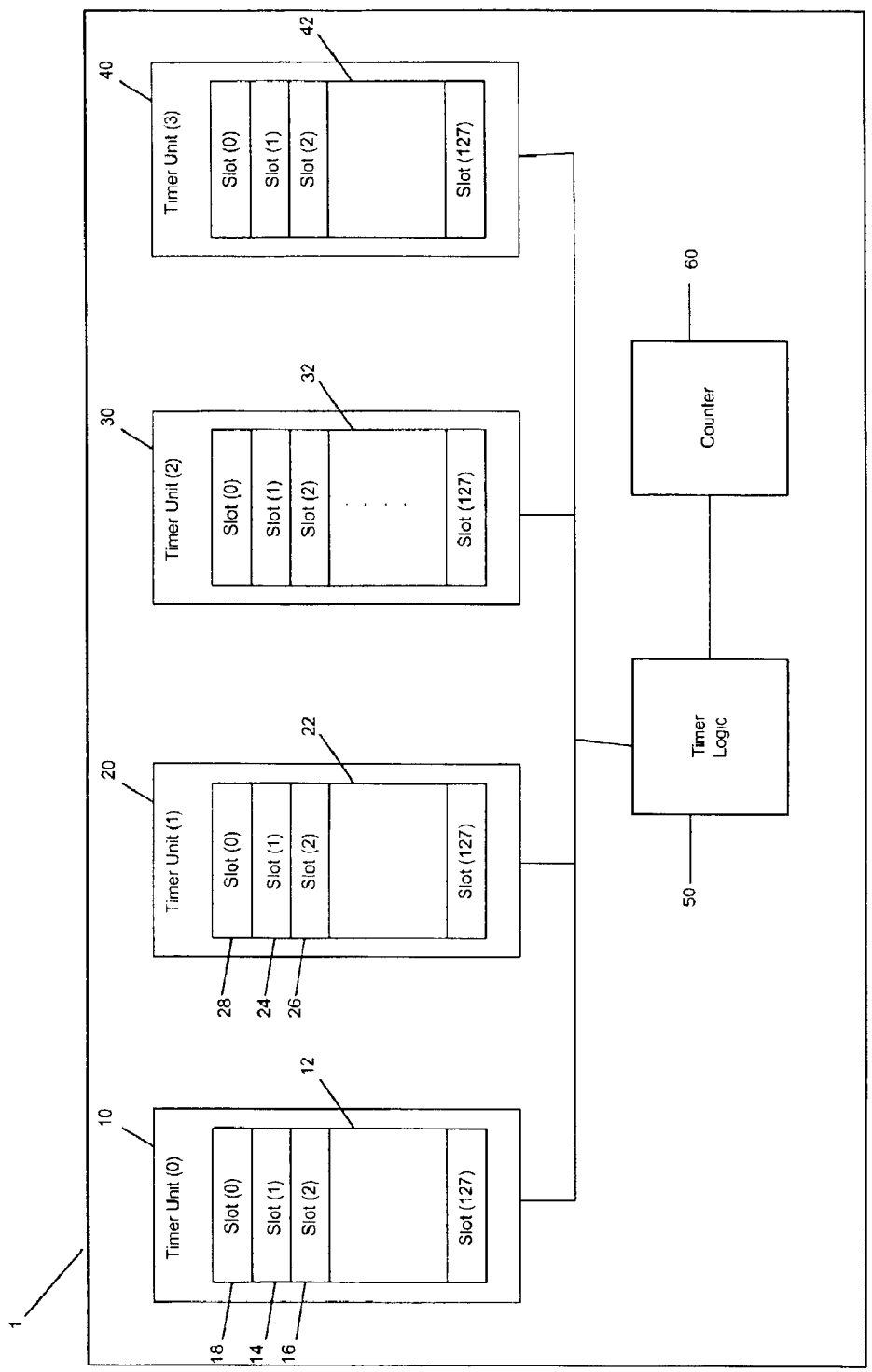
FIG. 1 shows an exemplary timer facility having four timer units according to the present invention.

The present invention may be further understood with reference to the following description of preferred exemplary embodiments and the related appended drawings, wherein like elements are provided with the same reference numerals. It should be understood that the present invention may be implemented on any processor or controller based device such as PCs, servers, PDAs, embedded devices, etc. and the term device will be used throughout this description to generically refer to all such devices. The exemplary embodiment of the present invention is also described as a timer facility implemented by an operating system for the described devices. However, the present invention may be implemented in any software scheme, for example, as part of a specific application, as a stand alone application, as a task or sub-task, as a Java® class or bean, etc. and in hardware, for example, in an application specific integrated circuit ("ASIC"). The device along with the software on the device (e.g., operating system, applications, etc.) may be referred to in this description as a system.

The exemplary embodiments of the timer facility of the present invention will be described with reference to one instance of the timer facility. Those of skill in the art will understand that any number of multiple instances of the timer facility may be active on a device at any particular moment. However, those of skill in the art will also understand that the exemplary embodiment of the timer facility according to the present invention may be used simultaneously by multiple tasks on different threads. Thus, multiple tasks on multiple threads may use the same instance of the timer facility according to the present invention. This feature may be used to save device resources because it alleviates the need to open multiple instances of a timer facility and saves the corresponding resources needed to open these multiple instances.

FIG. 1 shows an exemplary timer facility 1 having four timer units 10–40. The exemplary embodiment of the timer facility 1 according to the present invention allows for efficient processing of active timer facilities. For example, timeout settings may be quickly inserted into the timer facility 1 at the correct locations, the timeout settings may also be efficiently modified and the timeout settings may be quickly removed from the timer facility 1 when no longer needed to avoid the unnecessary use of system resources. The exemplary timer facility 1 of the present invention supports a variety of timeout modifications. For example, in addition to the modification of the timeout setting, the timer facility 1 supports the modification of the timeout function (e.g., the modification of the handler function for any particular timeout). In addition, modification may include the manner in which the countdown for the timeout settings occurs. As will be described in greater detail below, the timer facility 1 keeps track of time using a single counter, and the timer facility 1 may be updated (or modified) with each time interval of the counter. The single counter may be implemented as part of the timer facility 1 or may be implemented via a separate piece of hardware or software, for example, an operating system structure.

The timer facility 1 includes four timer units 10–40 (timer unit (0–3)) which each include a series of timer slots 12–42. In this example, each of the timer units 10–40 includes 128 timer slots (slots 0–127). The timer facility also includes timer logic 50 and a counter 60. In this exemplary embodiment, the counter 60 is included in the timer facility 1. However, as described above, the counter 60 may be implemented remote from the timer facility 1. Exemplary functions of the timer logic 50 include the use of binary operations to determine slot location and masks to determine slot update information, etc. Each of these functions will be described in greater detail below. Those of skill in the art will understand that the timer logic 50 may be implemented by each of the timer units 10–40 or independent such that each of the timer units 10–40 may access the timer logic 50.

Each of the timer slots represents a discrete number of clock cycle ticks for the device. As will become apparent from the description of the timer facility 1, the slots of each timer unit 10–40 (e.g., the slots 12 of timer unit 10) have a relationship to the other slots of the same timer unit. The relationship is based on the granularity of the individual timer unit 10–40. This relationship and the granularity will be described in greater detail below. Those of skill in the art will understand that the slots may be any data storage mechanism, for example, a table, entries in a linked list, an array, etc.

A timeout setting corresponding to the number of ticks may be placed into the slot such that when the specified number of ticks has passed, an alarm or other event may be triggered. Throughout this description the timeout settings will be described as alarm settings. However, those of skill in the art will understand that timeout settings may be used for any number of functions in addition to system alarms, e.g., automatic retransmission of data packets, login attempts, etc. In addition the term tick will be used to designate any time period which the device may measure. For example, in a typical embedded device, one (1) tick equals 100 ms (milliseconds).

FIG. 2 is a table 100 showing an exemplary configuration for the timer facility 1 shown in FIG. 1. In this configuration, table 100 shows the four timer units 10–40 in the timer unit column 102. The smallest timeout column 104 and the largest timeout column 106 show the range of timeout values which each of the timer units 10–40 cover. For example, the timer unit (0) 10 covers the range of ticks from 1 to 127, the timer unit (1) 20 covers the range of ticks from 128 to 508, the timer unit (2) 30 covers the range of ticks from 509 to 2032 and the timer unit (3) 40 covers the range of ticks from 2033 to 8128. Thus, in this exemplary configuration, the timer units 10–40 cover timeout settings over the range of values from 1–8128 ticks. This range of 8128 ticks is accomplished using only 572 timer slots, i.e., 128 slots in each of timer units 10–40. Those of skill in the art will understand that the range of values may be increased by adding additional timer units or increasing the granularity (described below) of the existing timer units 10–40.

The timeout settings for any particular timeout value will be placed into the appropriate timer unit 10–40. For example, a timeout setting of 75 ticks would be placed into one of the series of slots 12 in the timer unit(0) 10 because it covers the range from 1 to 127 ticks. Whereas, a timeout setting of 200 ticks would be placed into one of the series of slots 22 in the timer unit(1) 20 because it covers the range from 128 to 508 ticks. The method of determining the timer unit 10–40 and the particular slot into which the timeout setting is placed will be described in greater detail below.

The granularity column 108 shows the granularity of each of the timer units 10–40. The granularity is the interval between each of the slots of the timer units 10–40. For example, the granularity of the timer unit(0) 10 is one tick. Thus, referring to FIG. 1, the difference between the timeout values in slot(1) 14 and slot(2) 16 of timer unit(0) 10 is one tick. The granularity of the timer unit is directly related to the maximum range of timeout values for each of the timer units 10–40. As can be seen from table 100, the 128 slots of timer unit(0) 10 cover the timeout range from 1 to 127 ticks because the interval between each slot 12 is one tick. The first slot(0) 18 of the timer unit(0) represents a timeout value of zero. Therefore, in timer unit(0) 10, slot(0) 18 is equal to zero ticks, slot(1) 14 is equal to one tick, slot(2) 16 is equal to two ticks, etc. The maximum range is 127 ticks (127 slots at one tick per slot). In contrast, the granularity of the timer unit(1) 20 is four ticks. Thus, the difference between the timeout values in slot(1) 24 and slot(2) 26 of timer unit(1) 20 is four ticks. To continue with the example, in timer unit(1) 20, slot(0) 28 is equal to zero ticks, slot(1) 24 is equal to four ticks, slot(2) 26 is equal to eight ticks, etc. The maximum range is 508 ticks (127 slots at four ticks per slot). It should be noted that while the timer unit(1) 20 also covers the range 1–127 ticks of the timer unit(0) 10, the timer unit(1) 20 is not used for this range because the timer unit(0) 10 offers greater accuracy in this range. The range of the timer unit(1) 20 only starts above the maximum range for the timer unit(0) 10. Similarly, each subsequent timer unit covers the range of all of the previous timer units, but is only used for when the timeout setting exceeds the maximum range for the previous more accurate timer unit. The relationship between the granularity and the maximum range of the timer unit(2) 30 and timer unit(3) 40 should be apparent to those skilled in the art. The maximum error column 110 and the maximum error reduced column 112 will be described in greater detail below.

Figure 3:
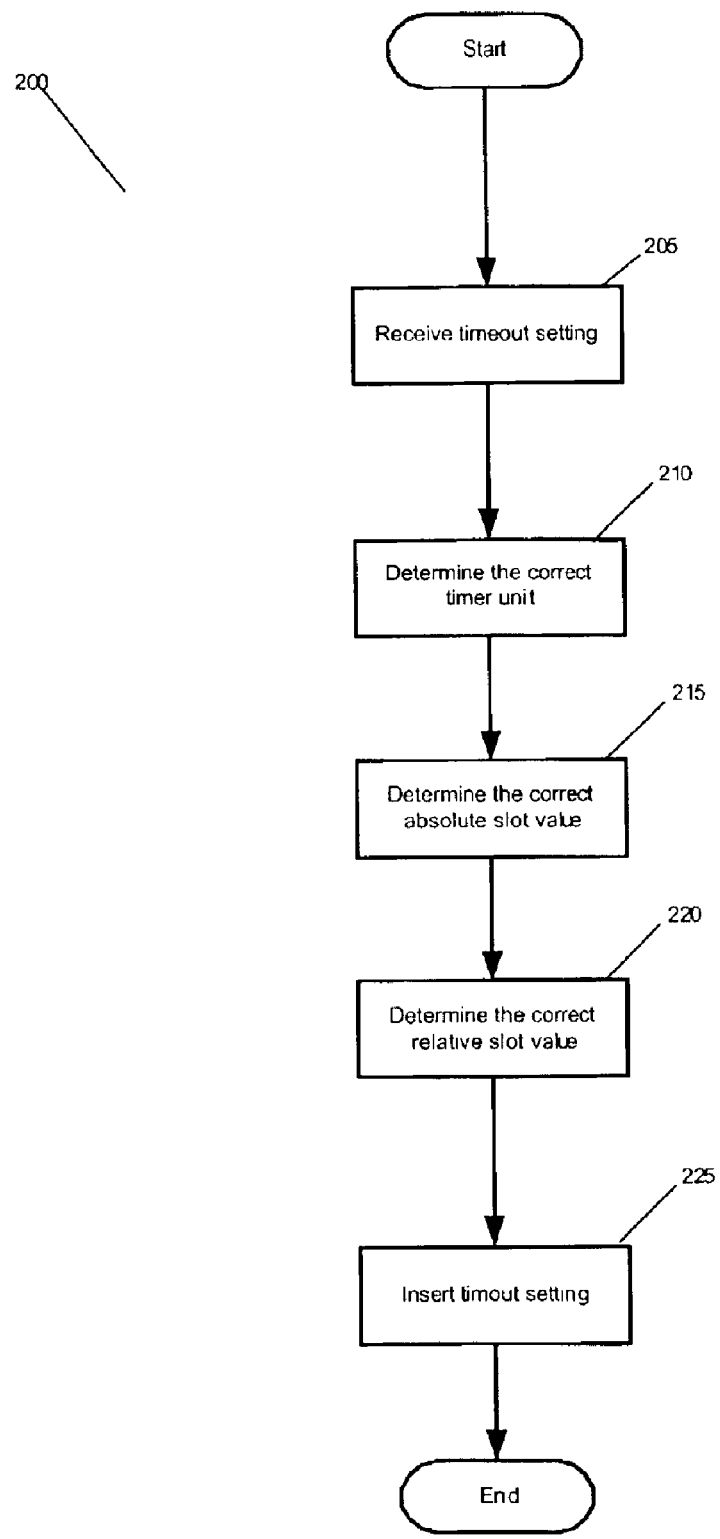
FIG. 3 shows an exemplary process for inserting a timeout setting into the timer facility according to the present invention.

FIG. 3 shows an exemplary process 200 for inserting a timeout setting into the timer facility 1. In step 205, the timer facility 1 receives the timeout setting which needs to be inserted into the timer facility 1. In the next step 210, the timer facility 1 determines the correct timer unit 10–40 into which the timeout setting should be inserted. The determination of the correct timer unit 10–40 is an iterative process that is described in more detail with reference to FIG. 4.

Figure 4:
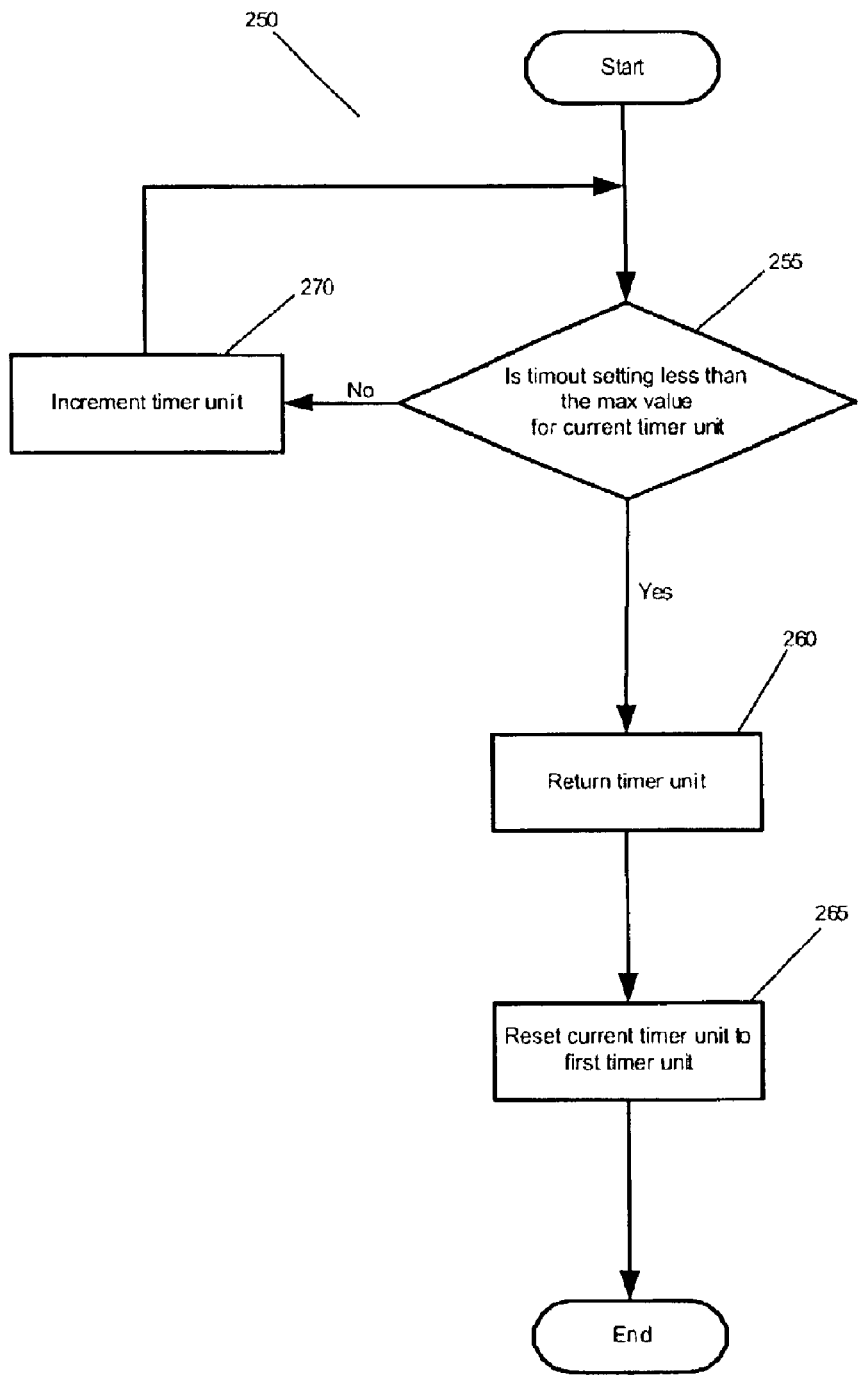
FIG. 4 shows an exemplary process for determining the correct timer unit into which a timeout setting should be placed according to the present invention.

FIG. 4 shows an exemplary process 250 for determining the correct timer unit 10–40 into which a timeout setting should be inserted. In the first step 255, the process determines whether the timeout setting is less than the maximum value for the first timer unit (or in the alternative if the maximum value for the first timer unit is greater than the timeout setting). In this example, the maximum value for the first timer unit(0) 10 is 127 ticks. Thus, the timer facility 1 will determine whether the timeout setting is less than 127 ticks. Those of skill in the art will understand that the comparison of the two values may be accomplished using very simple binary addition or subtraction. As will be described in greater detail below, the determination of the correct timer unit 10–40 may be based on the granularity and number of slots in each of the timer units 10–40.

FIG. 5 shows a table 300 having the binary representations of a series of numbers. The top row 302 shows the value of each binary column and each of the subsequent rows show the binary representation of a series of values. For example, the row 304 shows the binary representation of the value of 127 which is the maximum value for the first timer unit(0) 10. The timer facility 1 has the timeout setting in binary format and, as stated above, through simple binary addition or subtraction it may be determined if the timeout setting is greater than or less than the maximum value for the timer unit.

If in step 255 it is determined that the timeout setting is less than the maximum value of the current timer unit, the timer facility 1 has determined that the timeout setting should be inserted into one of the slots of the current timer unit and the process returns this timer unit in step 260. For example, if the timeout setting was 75 ticks, the process 250 would determine in step 255 that the timeout setting of 75 ticks is less than the maximum value of 127 ticks for the first timer unit(0) 10. The process would then return the first timer unit (0) in step 260 and the timer facility 1 would know that the timeout setting of 75 ticks should be inserted into the first timer unit.

If in step 255 it is determined that the timeout setting is greater than the maximum value, the timer facility 1 will know that the timeout setting should not be inserted into the current timer unit. The process then continues to step 270 where the current timer unit is incremented to the next timer unit. For example, if it was determined that the timeout setting was greater than the maximum value of 127 ticks of the timer unit(0) 10 in step 255, the process will increment the current timer unit to the timer unit(1) 20 in step 270.

As part of this incrementing step, the process will increase the maximum value to correspond to that of the new current timer unit. The process of increasing the maximum value may be carried out using the simple binary operation of shifting the current maximum value two places to the left. Referring to FIG. 5, the row 304 shows the binary representation of the maximum value of 127 ticks for the timer unit(0) 10. The row 306 shows the binary representation of the maximum value of 508 ticks for the timer unit(1) 20. As shown in FIG. 5, the binary representation of 508 ticks may be determined by shifting the binary representation of 127 ticks two places to the left, i.e., padding two zeroes on the right. The result of this shifting is essentially equal to multiplying the maximum value by four. However, the system resources used for the simple action of binary shifting are significantly less than those which are used for the more complicated action of binary multiplication. Thus, the timer facility 1 in implementing the incrementing step 270, does not add a significant amount of overhead to the system because it avoids the high overhead multiplication operation.

As shown in FIG. 5, increasing the maximum value of 508 ticks (row 306) of the timer unit(1) 20 to the maximum value of 2032 ticks (row 308) of timer unit(2) 30 and increasing the maximum value of 2032 ticks (row 308) of the timer unit(2) 30 to the maximum value of 8128 ticks (row 310) of timer unit(3) 40 may be performed using the same binary shifting two places to the left. The relationship between the maximum values of adjacent timer units (e.g., timer unit(0) 10 and timer unit(1) 20) is the same as the relationship between the granularity of the timer units. For example, the granularity of timer unit(0) 10 is one tick and the granularity for the timer unit(1) 20 is four ticks resulting in a four to one relationship. Similarly, the maximum values for the same timer units are 127 ticks and 508 ticks, respectively. This is the same four to one relationship. This is the reason that the binary shifting of the maximum value of the lower timer unit results in the maximum value of the higher timer unit, i.e., the binary shifting is equal to multiplying the lower maximum value by four.

There may be instances where the relationship between the granularities of adjacent timer units is greater than four to one. For example, in the exemplary timer facility 1, it may be possible to eliminate the timer unit(1) 20 and have the timer unit(2) 30 cover the entire range from 128 ticks through 2032 ticks. In this case, when the timer facility 1 incremented up from timer unit(0) 10 in step 270, the timer unit(2) 30 would be the next timer unit. The relationship between the granularities of the timer unit(0) 10 and timer unit(2) 30 is sixteen to one. Therefore, when incrementing the maximum value from the timer unit(0) 10 to the timer unit(2) 30, the incrementing must be by a factor of sixteen (e.g., 127 ticks to 2032 ticks). However, as shown in FIG. 5, this incrementing of the maximum values of 127 ticks (row 304) to 2032 ticks (row 308) may be accomplished by shifting the binary representation four places to the left because this shift is equal to multiplying by sixteen. Those of skill in the art will understand that a smaller relationship between the granularities of adjacent timer units is also possible, for example, two to one.

The maximum range of the timer facility 1 may be increased by adding additional timer units or by increasing the granularity of the existing timer units 10–40. The above example shows how increasing the granularity of the timer units may increase the range of the timer facility 1 without increasing the number of timer units. For example, if the granularities of the four timer units 10–40 was 1, 16, 64 and 256, respectively (as opposed to the values of 1, 4, 16, 64 as shown in table 100), the range of the timer facility 1 would increase from 8128 ticks to 32,512 ticks. However, the process 250 for determining the correct timer unit 10–40 would remain the same, except that the shifting to the left of the binary values to determine the maximum range for each timer unit when incrementing the timer units would be by four places rather than two. Those of skill in the art will also understand that as the granularity of the timer units increases, the accuracy of the timer units is decreasing.

Returning to the process 250 of FIG. 4, after the timer unit is incremented in step 270, the process loops back to step 255 to determine if the timeout setting is less than the maximum value of the new current timer unit. If it is not, the process goes back to step 270 to increment to the next timer unit as described above. The process will continue until the correct timer unit is determined and returned to the timer facility 1 in step 260. After the timer facility has determined the correct timer unit, the process resets the current timer unit to the first timer unit (e.g., timer unit(0) 10) in step 265. The process is then complete because the timer facility 1 knows into which timer unit the timeout setting will be inserted.

It may be possible that the timeout setting exceeds the maximum range of all the timer units in the timer facility 1 resulting in the return of no timer. This is an error condition. Those of skill in the art will understand the additional steps which may be included in the process 250 of FIG. 4 to handle such an error condition. For example, if the timer units have incremented to the last timer unit and it is determined that the timeout setting still exceeds the maximum value for the last timer unit in step 255, the process may return an error and then the process may end. In addition, such an error may also impact the process 200 of FIG. 3 because the step 210 would not be completed. Those of skill in the art will also understand the additional steps which may be included in the process 200 to handle such an error condition. For example, when the error is returned as a result of the maximum range of the timer facility 1 being exceeded, the timer facility 1 may return this error to the user (or developer) and end the process 200.

Returning to the process 200 of FIG. 3, after the correct timer unit has been determined in step 210, the correct slot of the timer unit into which the timeout setting should be inserted is determined in steps 215 and 220. The determination of the correct slot is a two step process. First the absolute value of the slot is determined based on the timeout setting (step 215) and then the relative position of the slot is determined based on the absolute slot value and the current value of the timer facility 1 (step 220). One manner of determining the absolute value of the slot for the timeout setting is to divide the timeout setting value by the granularity value of the timer unit. However, the binary division operation is a very high overhead process. The exemplary embodiment of the present invention allows for the determination of the absolute value for the slot using a low overhead binary shifting operation.

Before addressing the binary shifting operation, the case of the first timer unit(0) 10 having a granularity value of one tick will be addressed. In the case of timer unit(0) 10, the binary shifting operation does not need to be performed because there is a one to one correspondence between the absolute value for the slot and the timeout setting. For example, if the timeout setting is 80 ticks, the absolute slot value is slot(80) of the timer unit(0) 10. If the timeout setting is 100 ticks, the absolute slot value is slot(100). Thus, the binary shifting operation does not need to be performed when the timeout setting is in the range of 1 to 127 ticks and is inserted into the first timer unit(0) 10. Those of skill in the art will understand that this relationship is dependant upon the exemplary one tick granularity of the timer unit(0) 10.

Figure 6:
FIG. 6 shows a first exemplary right binary shifting operation according to the present invention.

When the timeout settings are to be inserted into one of the subsequent timer units 20–40, the binary shifting operation is employed. FIG. 6 shows an exemplary right binary shifting operation where the binary representation of the timeout setting of 200 ticks is shown in row 320 and the shifted value of 50 is shown in row 322. This example will be used to describe the binary shifting operation used to determine the absolute slot value for the timer units 20–40. In this example, the timeout setting is 200 ticks. Thus, the process will determine in step 210 that timer unit(1) 20 is the correct timer unit because 200 ticks is in the range covered by that timer unit. To determine the absolute slot value in timer unit(1) 20 for the timeout setting of 200 ticks, the timer facility 1 will take the binary representation of 200 tick timeout setting as shown in row 320 and shift the value two places to the right. The result of this shifting is shown in column 322 as the binary representation of the value 50. Thus, the timeout setting of 200 ticks has an absolute slot value of slot(50) of the timer unit(1) 20.

This binary shifting of two places to the right is equivalent to dividing the value by four, except that the binary shifting operation is simpler and entails less overhead than binary division. The amount of shifting, i.e., the number of places, is dependent upon the granularity of the individual timer unit 20–40 into which the timeout setting is to be inserted. The example above showed a shifting of two places to the right because the granularity of the timer unit(1) 20 is four ticks and this shifting is equivalent to dividing the timeout setting by four.

FIG. 7 shows an example of binary shifting where the timeout setting is to be inserted into the third timer unit(2) 30 which has a granularity of 16 ticks. The exemplary timeout setting in FIG. 7 is 560 ticks which is represented in binary form in row 330. As described above, the timer facility 1 will determine that the timeout setting of 560 ticks should be inserted into the timer unit(2) 30 because it is in the range covered by that timer unit (step 210 of process 200). The timer facility 1 will then binary shift the binary value of 560 ticks (row 330) to determine the correct absolute slot value in the timer unit(2) 30. Since the granularity of the timer unit(2) 30 is sixteen ticks, the shifting must be equivalent to dividing the timeout value by sixteen. Therefore, the timer facility 1 shifts the binary value of 560 ticks (row 330) four places to the right which results in the binary representation of the value 35 (row 332). The timer facility 1 has therefore determined that the absolute slot value in timer unit(2) 30 for the timeout setting of 560 ticks is slot(35). As can be seen from the above examples, the binary shifting to determine the absolute slot value is dependent upon the granularity of the timer unit.

In the above two examples of FIGS. 6–7, the right shifting of the binary representation of the timeout settings did not result in the dropping of any one values, i.e., all the values shifted out of the binary number were zeroes. This was a result of the fact that the two exemplary timeout values (200 and 560) were divisible by the granularity of the respective timer units without any remainder. However, there may be instances where the shifting results in the dropping of binary one values, i.e., the division results in a remainder. In such a case, there is an error associated with the determined absolute slot value. The maximum error for any timer unit may be determined based on the granularity of the timer unit. The maximum errors for the exemplary timer units 10–40 are shown in column 110 of FIG. 2. The determination of these maximum errors are described below.

FIG. 8 shows an example of binary shifting of four binary timeout settings in rows 340–346 that result in the same binary absolute slot value in row 348. The exemplary timeout settings of 196–199 ticks will all be inserted into the timer unit(1) 20, therefore, as described above, in order to determine the absolute slot value the binary shifting will be two places to the right. In this example, the binary representations of the four timeout settings 196–199 ticks are shown in rows 340–346. As illustrated in FIG. 8, binary shifting of each of these values results in the binary representation of the value 49. Therefore, based on this shifting, the timer facility 1 would determine the absolute slot value to be slot(49) of the timer unit(1) 20 for each of the timeout settings of 196–199 ticks. The actual time value associated with slot(49) of timer unit(1) 20 is 196 ticks (49 slots at 4 ticks per slot). If each of the timeout settings was inserted into the slot(49), the alarm associated with each of the timeout settings would occur simultaneously at 196 ticks. Thus, there would be an error for each of the timeout settings that is not exactly 196 ticks. In this case, the largest error would be for the timeout setting of 199 ticks. The alarm associated with the 199 tick timeout setting would be triggered at 196 ticks resulting in an error of (−3) ticks. This (−3) ticks error is the maximum error for a timer unit having a granularity of four as shown in column 110 of FIG. 2. The maximum error for the timer units having different granularities are also shown in column 110 of FIG. 2. The determination of these maximum error values should be apparent to those of skill in the art based on the above example. In addition, those of skill in the art will understand these errors only pertain to the slot determination. There may be additional errors resulting from, for example, the alarm handlers, the order of the timeout settings is the slot, etc.

It is possible to reduce the maximum error associated with the shifting by having the timer facility 1 check a portion of the binary value before it is shifted and then adjusting the absolute slot value after the shifting to reduce the error. For example, referring to FIG. 8, the timer facility 1, before shifting the timeout setting, may check the two values that are to be shifted out. In the case of a two place shift, there are four possible combinations of binary values (00, 01, 10, 11). The binary value 00 will result in no error because the absolute slot value will be equal to the timeout setting (e.g., 196 tick timeout setting (row 340) is equal to the absolute slot(49) value of 196 ticks). In this case, the timer facility 1 does not need to adjust the absolute slot value. The binary value 01 will result in a (−1) ticks error because the absolute slot value will be one less than the timeout setting (e.g., the absolute slot(49) value of 196 ticks is one less than the 197 tick timeout setting (row 342)). In this instance, the timer facility 1 may increment the absolute slot value from slot (49) to slot(50). However, if the timeout setting of 197 ticks is in the slot(50) position which has a value of 200 ticks (50 slots at 4 ticks per slot), the alarm associated with the timeout setting of 197 ticks would not be triggered until 200 ticks resulting in an error of (+3) ticks. An incrementing of the absolute slot value in this case results in a higher error. Thus, in the most likely scenario, the timeout setting of 197 ticks would remain with an absolute slot(49) value because this results in a smaller error than incrementing the absolute slot value.

The binary value 10 will result in a (−2) ticks error because the absolute slot value will be two less than the timeout setting (e.g., the absolute slot(49) value of 196 ticks is two less than the 198 tick timeout setting (row 344)). As described above, the timer facility may increment the timeout setting from slot(49) having an error of (−2) ticks to slot(50) which would result in an error of (+2) ticks. It may be considered that a (+2) tick error is greater than a (−2) tick error because the (+2) tick error will result in the alarm coming 2 ticks late as opposed to 2 ticks early with a (−2) tick error. The determination of whether to increment the absolute value for this type of timeout setting is dependent on the user's preference. To complete the example, the binary value 11 will result in a (−3) ticks error as described above. Incrementing the timeout setting from slot(49) to slot(50) would reduce the error from (−3) ticks to (+1) tick. As shown in FIG. 2, the maximum reduced error column 112 shows that the maximum reduced error for the timer unit(1) 20 having a granularity of four ticks is (+2) ticks. As demonstrated by the above example, the previous discussed maximum error of (−3) ticks may be reduced leaving the (+2) tick error as the maximum reduced error. Therefore, the timer facility 1 may reduce the error associated with the right binary shifting by the intelligently incrementing the absolute slot value as described above. This comparison of the values and the incrementing of the slot value may be done without complicated binary multiplication and division and therefore does not result in a high overhead cost to the timer facility 1. The error increases as the timeout settings increase, but, in general, a system is able to tolerate a larger error at larger timeout values.

Those of skill in the art will understand that the above error discussion relates only to the error associated with the determination of the absolute slot value. There may be additional errors that are added because of the determination of the relative slot value as described below. The same type of error reducing algorithm may be applied to the determination of the relative slot value. In addition, there be other types of errors such as latency which may be introduced into the system.

After the absolute slot value has been determined in step 215, the timer facility must determine the relative slot value in step 220. The relative slot value is used to place the timeout setting in the appropriate slot of the timer unit 10–40. In the example above, it was determined that the absolute slot value of a timeout setting of 200 ticks is 50. However, the alarm associated with the timeout setting is not 200 ticks from time 0, but 200 ticks from the time that the application desires to insert the timeout setting. The 200 ticks is relative to the current time value. If the timer facility were to place the 200 tick timeout setting in slot(50) of the timer unit(1) 20, but 196 ticks of the counter 60 had already passed, the alarm would be generated in four ticks, i.e., after 196 ticks of the counter 60, the slot(49) of the timer unit(1) 20 would be updated because it represents 196 ticks. Therefore, the timeout setting of 200 ticks must be placed 200 ticks from the currently updated slot value. In this example, the timeout setting of 200 ticks with an absolute slot value of 50 would be placed in slot(99) of the timer unit(1) 20, i.e., current slot value 49 plus absolute slot value 50. This determination of the relative slot value is another simple binary addition operation where the current slot value is added to the absolute slot value of the timeout setting.

Each of the timer units 10–40 will continuously cycle through the corresponding slots. For example, after the first 508 ticks which includes all the slots of the timer unit(1) 20, the timer unit(1) 20 will start again as if the $509^{th}$ tick were the first tick. Thus, the slot(1) of the timer unit(1) 20 would be updated again after 512 ticks. This may be important because the relative slot value may have to be inserted on the next cycle. Referring again to the previous example of a 200 tick timeout setting with an absolute slot value of 50, the current slot value on timer unit (1) 20 may be slot(100). When the absolute slot value 50 is added to the current slot value, the result is 150. However, the timer unit(1) 20 only contains goes as high as slot(127). Therefore, the timeout setting of 200 ticks must be inserted into slot(23) of timer unit(1) 20, e.g., 27 slots from 101–127 plus another 23 slots from 1–23 of the next cycle equals 50 total slots.

FIG. 9 shows exemplary binary addition and subtraction operations using an exemplary mask to determine a slot location for a timeout setting, while accounting for the turning over of the next cycle of the timer unit when adding the absolute slot value to the current slot value. This example continues with the example above where the current slot value is slot(100) shown in its binary representation in row 350 and the absolute slot value for the timeout setting is 50 shown in its binary representation in row 352. These two binary numbers are added resulting in the value 150 shown in its binary representation in row 354. Those of skill in the art will understand the mechanics and implementation of binary addition. As described above, the maximum slot value in the timer unit(1) 20 is slot(127). Therefore, the timeout setting needs to be inserted in the next cycle of the timer unit(1) 20. To determine the correct slot of the next cycle, a mask of 127 (the maximum slot number for the timer unit(1) 20 shown in binary representation in row 356) is subtracted from the value 150 (row 354). The result of the binary subtraction is a value of 23 shown in binary representation in row 358. Those of skill in the art will understand the mechanics and implementation of binary subtraction. Therefore, the timeout setting should be inserted into slot (23) of the timer unit(1) 20. Since the maximum slot value for each of the timer units 10–40 in the exemplary timer facility 1 is slot(127), the same mask may be used to determine the next cycle slot for each timer unit 10–40 as appropriate.

After the timer facility has determined the relative slot value in step 220, the process 200 may continue to step 225 where the timeout setting is actually inserted into the timer unit. When the timer unit arrives at the slot where the timeout setting has been inserted, the timer may send a signal to the application in order to alert it that the timeout setting has expired. The timeout setting may then be removed from the timer unit slot or it may be updated and moved to a new slot. The updating of the slot location will be performed using the same process as described above.

A feature of the exemplary embodiment of the present invention is that a single counter 60 may be used for all the timer units 10–40. The slots in each timer are updated as the counter 60 increments. For example, after one tick of the counter 60, slot(1) of timer unit(0) 10 is updated because it represents a value of one tick. After the fourth tick of the counter 60, slot(4) of the timer unit(0) 10 is updated and slot(1) of the timer unit(1) 20 is updated because both slots represent four ticks. A single counter 60 may be used because while the four timer units work in concert to cover a range of timeout values, they are not hierarchical. This means that one timer unit is not dependent on any other timer unit, it is only dependent upon the single counter 60. If the timer unit(0) 10 failed for some reason, it would not prevent the subsequent timer units 20–40 from continuing to perform their functions because the subsequent timer units 20–40 do not build upon the range covered by the timer unit(0) 10, but independently keep track of the same range covered by the timer unit(0) 10. As described above, the subsequent timer units 20–40 are not responsible for the range covered by the timer unit(0) 10 because that timer unit is more accurate than the subsequent timer units 20–40 within this range. This single counter 60 results in a much lower overhead than having multiple counters.

FIGS. 10*a*–*d* show exemplary binary mod operations used to determine whether to update the current slot of a timer unit. In this description, the updating of slots refers to the checking of a slot at the correct time to determine whether there is a timeout setting in that slot and taking the appropriate action if there is such a timeout setting. As previously described, each slot is related to a specific timer period, e.g., slot(2) of the timer unit(0) 10 is related to the time period of two ticks, slot(50) of the timer unit(1) 20 is related to the time period of 200 ticks, etc. The timer facility 1 does not need to update each timeout setting or slot after each tick of the clock or increment of the counter because the checking of a slot is implicit. For example, if a timeout setting has been inserted into slot(50) of the timer unit(1) 20 as described above, the timer facility 1 does not need to check slot(50) or the timeout setting after each counter increment to determine whether the timeout setting has expired or to decrement the timeout setting by one tick. When the actual time related to the slot has expired (e.g., 200 ticks) the timer facility 1 will arrive at the slot related to that time period. If there is a timeout setting in that slot, then the timeout setting has expired. If there is no timeout setting in the slot, no timeout settings are related to that time period and the timer facility 1 does not need to take any action. Thus, once a timeout setting is inserted into a slot, the timer facility 1 does not need to be concerned about the timeout setting until the timer facility 1 reaches that slot containing the timeout setting (unless the timer facility 1 desires to remove or move the timeout setting).

In addition, updating the slot may also refer to the timer unit 10–40 or timer logic 50 making an indication that the counter 60 has reached the time period corresponding to the slot. For example, when the counter 60 reaches five ticks, the timer unit(0) 10 or the timer logic 50 may be updated to indicate the time corresponding to the slot(5) (5 ticks) has been reached. If, in this example, the slots were a linked list, there may be a pointer in the timer unit(0) 10 or the timer logic 50 which points to the entry in the linked list corresponding to the slot(5). This may be used to determine which slot is the current slot for use, as described above, to determine the relative slot value and for the timer facility 1 to check whether there are any timeout settings in the slot(5). Those of skill in the art will understand that the method to indicate the current slot may vary depending on the actual structure of the slots in the timer units 10–40.

As the counter 60 increments, the timer facility 1 must determine whether to update the slots of the timer units 10–40. A binary mask may be used to make this determination. FIG. 10*a* shows a first example where the counter 60 has a value of one (e.g., one tick). In these examples, the determination is shown for the first three timer units 10–30. The example will provide those of skill in the art the understanding to make the determination for the last timer unit(3) 40 and any subsequent timer units. The row 360 shows the current counter 60 value in binary form (e.g., one). The row 362 shows the mask for each of the timer units 10–30. The mask is also related to the granularity of the timer unit. In this case, since a mod operation will be used, the mask will be equal to one less than the granularity of the timer unit. For example, the granularity of timer unit(0) 10 is one (1) and the mask value in row 362 is zero (0). The granularity of timer unit(1) 20 is four (4) and the mask value in row 362 is three (3) and the granularity of timer unit(2) 30 is sixteen (16) and the mask value in row 362 is fifteen (15).

Using a mod operation with these masks and the current counter 60 value essentially determines whether the current counter 60 value may be divided by the granularity value of the timer unit. If the result of the mod operation is a zero (0) remainder, the next timer unit slot will be updated. Continuing with the example of FIG. 10*a*, the mask for the timer unit(0) 10 is the binary value 0. The result of the mod operation with binary value 0 is always the binary value 0. Therefore, the slots of the timer unit(0) 10 will be updated with every new value of the counter 60. The mask for the timer unit(1) 20 is the binary value 11 and the result of the mod operation with the counter 60 binary value 1 is the non-zero binary value 01 (row 364). Thus, the slots of the timer unit(1) 20 do not need to be updated for this counter 60 value. Similarly, the result of the mod operation of the mask binary value of 1111 for the timer unit(2) 30 and the counter 60 binary value 1 is the non-zero binary value 0001 (row 364) meaning that the slots of the timer unit(2) 30 do not need to be updated for this counter 60 value. Those of skill in the art will understand that the mod operation only needs to be carried out to the number of units in the mask for each timer unit.

In the example of FIG. 10*b*, the counter 60 value is shown as the binary representation of the value four, e.g., 00100 (row 370). Each of the masks for the timer units 10–30 are shown in row 372 and the results of the mod operation are shown in row 374. The result for the timer(0) 10 is the binary value 0 meaning that the next timer unit slot will be updated. The result for the timer unit(1) 20 is the binary value 00 meaning that the next timer unit slot will be updated. As described above, the granularity of the timer unit(1) 20 is four. The counter 60 value of four is divisible by this granularity and therefore the next slot (e.g., slot(1) of timer unit(1) 20) will be updated. The result for the timer unit(2) 30 is the non-zero binary value 0100 meaning that the next timer unit slot does not need to be updated. Thus, in this example, two of the three timer units will have their slots updated based on the same counter 60 value.

In the example of FIG. 10*c*, the counter 60 value is shown as the binary representation of the value five, e.g., 00101 (row 380). Each of the masks for the timer units 10–30 are shown in row 382 and the results of the mod operation are shown in row 384. The result for the timer(0) 10 is the binary value 0 meaning that the next timer unit slot will be updated. The result for the timer unit(1) 20 is the non-zero binary value 01 meaning that the next timer unit slot does not need to be updated. The result for the timer unit(2) 30 is the non-zero binary value 0101 meaning that the next timer unit slot does not need to be updated. Therefore the counter 60 value five only results in the update of the slots in timer unit(0) 10.

Finally, in the example of FIG. 10*d*, the counter 60 value is shown as the binary representation of the value sixteen, e.g., 10000 (row 390). Each of the masks for the timer units 10–30 are shown in row 392 and the results of the mod operation are shown in row 394. The result for the timer(0) 10 is the binary value 0 meaning that the next timer unit slot will be updated. The result for the timer unit(1) 20 is the binary value 00 meaning that the next timer unit slot will be updated. The result for the timer unit(2) 30 is the binary value 0000 meaning that the next timer unit slot will be updated. Therefore the counter 60 value sixteen results in the update of the next slot in each of the timer units 10–30.

When a slot is updated as a result of the counter 60 value and the slot contains a timeout setting, the timer facility 1 will report the expiration of the timeout setting to the application or other program that inserted the timeout setting. The inserting application may then take the appropriate action based on the fact that the timeout setting has expired. For example, a network protocol may have inserted a timeout setting into slot(16) of timer unit(0) 10. The timeout setting may be, for example, related to the retransmission of a data packet if the protocol did not receive a confirmation before the timeout setting expired. Thus, when the counter 60 value has reached sixteen (e.g., example of FIG. 10*d*), and the slot(16) of timer unit(0) 10 has been updated, the timer facility 1 will determine that slot(16) contains a timeout setting that has expired and will notify the application that inserted the timeout setting. The application may then take the appropriate action, for example, re-transmitting the data packet.

Figure 11:
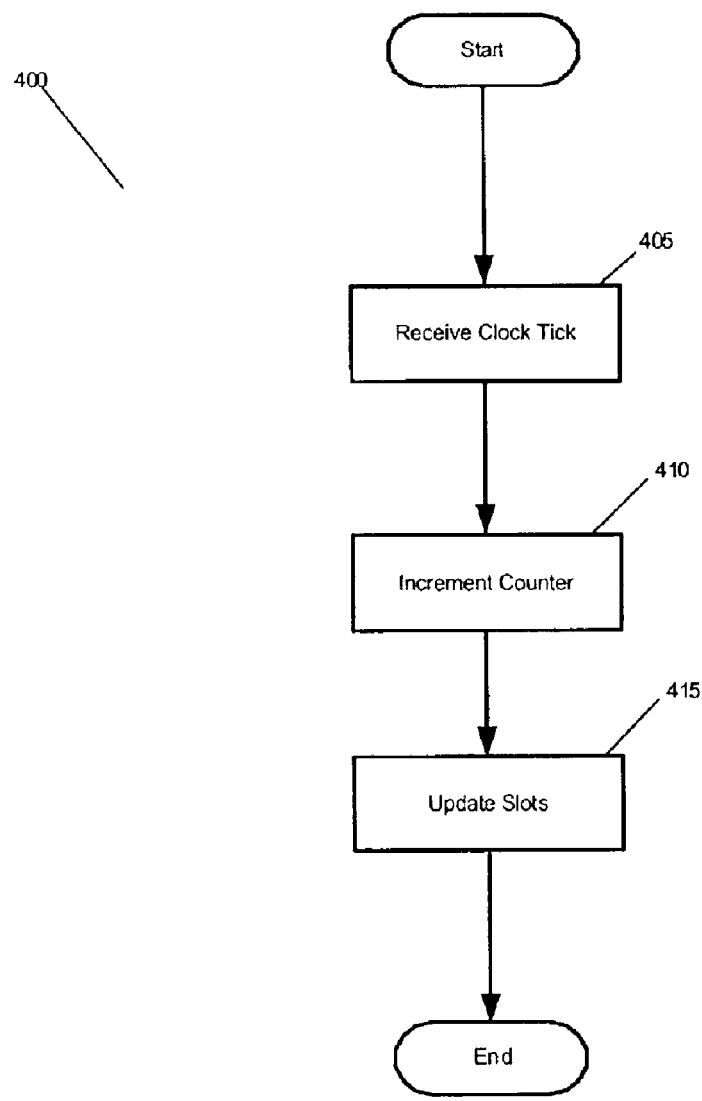
FIG. 11 shows an exemplary process for the operation of a timer facility according to the present invention.

FIG. 11 shows an exemplary process 400 for the operation of a timer facility 1. In step 405, the counter 60 may receive a clock tick from the device clock. The counter 60 may then increment to the next value (step 410). For example, the current value of the counter 60 may be eleven ticks. When it receives the next tick from the device clock (step 405), the counter 60 may increment its value to twelve ticks.

In step 415, the timer facility may then update the appropriate slots based on the new value of the counter 60. The above examples which refer to FIGS. 10*a*–*d* describe how the counter 60 value may be used to update the slots. As part of the updating, the applications which placed the timeout settings in the slot may be notified that the timeout setting has expired. Those of skill in the art will understand that many different types of software in addition to applications may place timeout settings in the slots of the timer facility 1 and applications are only exemplary.

The actual timeout settings which are placed in the slots may be, for example, data structures which contain information about the timeout setting and/or the application which inserted the timeout setting. For example, the timeout setting may be a data structure which includes a timeout identifier, a value, and a pointer to the application. In this example, the timeout identifier may have been selected by the application so that the timeout setting can be uniquely identified. For example, if the timeout setting expired, and the timer facility 1 returned the expired timeout setting to the application, the application would know which timeout setting had expired so it could take the appropriate action. In addition, it may be that the application completes the desired task to which the timeout setting is related, e.g., receive a confirmation. In this case, the application may use the identifier to signal the timer facility 1 to remove the timeout setting because it is no longer needed. As previously described, the timer facility 1 allows for the efficient removal of timeout settings. Since the timeout setting is a data structure that is inserted into a slot (e.g., a table, linked list entry, array, etc.), the removal of the entry relating to the timeout setting is a simple operation.

Continuing with the timeout data structure, the value may be, for example, the number of ticks for the timeout setting so the timer facility 1 may determine the correct timer unit 10–40 and slot to insert the timeout setting. The pointer to the application may be used by the timer facility 1 to notify the application that the timeout setting expired. Other information which may be included in the timeout setting may include a pointer to a timer function or a timeout handler so that when the timeout setting expires, the correct timer function or handler within the application is notified. Those of skill in the art will understand that additional information may be included in the timeout settings and this information may be used or triggered when the timeout setting expires and the timer facility 1 notifies the inserting application of the expiration.

There may be instances where there are multiple timeout settings placed in the same slot of a timer unit 10–40. The multiple timeout settings may be inserted by a single application or by multiple applications. In these cases, the timer facility 1 will operate in the same manner as if there was a single timeout setting in the slot. The timer facility 1 will use the information in each of the timeout settings in the slot to notify the application(s) of the expiration of the timeout settings. The order of the notification may depend upon the order of insertion into the slot (e.g., LIFO, FIFO, etc.). The timeout settings may include in their data structures a priority setting where an application that inserted a higher priority timeout setting is notified first regardless of the order of insertion.

The updating of the slots may include the removal of the timeout settings from the slots after the application is notified or, as described above, when the timeout setting is no longer necessary. Additional steps may also be added to show that a timeout setting may be modified. For example, a timeout setting may have been inserted into a particular slot and, at a later time, the value of the timeout setting may have changed. The timeout setting may then be moved to a new slot based on the new value. Another exemplary change may be that a timeout setting includes pointer information to a particular timer function. The application may desire to change the timer function to which the timeout setting points. The timer facility 1 when notified of the change may modify the timeout setting to point to the new timer function.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising the steps of:
receiving a timeout setting;
determining a selected timer unit of one of a first timer unit and a second timer unit, wherein a first set of slots is included in the first timer unit and a second set of slots is included in the second timer unit, the selected one of the timer units being determined by determining a maximum time period of the first timer unit based on a number of slots in the first set of slots and a granularity which defines a relationship between each slot in the first set of slots, comparing the timeout setting to the maximum time period of the first timer unit, and incrementing to the second timer unit if the timeout setting is greater than the maximum time period of the first timer unit;
determining one of the first slots and the second slots into which the timeout setting is to be inserted; and
inserting the timeout setting into the one of the slots.

2. The method according to claim 1, wherein the incrementing to the second timer unit includes the step of:
shifting a binary representation of the maximum time period of the first timer unit to the left to determine a maximum time period of the second timer unit, wherein a number of places to shift is based on a relationship between the granularity of the first set of slots and a granularity of the second set of slots.

3. The method according to claim 1, wherein a time value of the timeout setting is based on the clock tick cycles of a device.

4. The method according to claim 3, wherein the granularity of the first set of slots is equal to one of one clock tick cycle, four clock tick cycles and sixteen clock tick cycles.

5. The method according to claim 1, wherein a second granularity defines a relationship between each slot in the second set of slots.

6. The method according to claim 5, wherein a ratio between the granularity and the second granularity is one of one to four and one to two.

7. The method according to claim 1, wherein the determining of the slot includes the steps of:
determining an absolute slot value based on a value of the timeout setting; and
determining a relative slot value based on the absolute slot value and a current slot value.

8. The method according to claim 7, wherein the determining of the absolute slot value includes the step of:
shifting a binary representation of the timeout setting to the right, wherein a number of places to shift is based on a granularity which defines a relationship between the plurality of slots.

9. A system, comprising:
a first timer unit including a first plurality of slots, each slot representing a time period
a second timer unit including a second plurality of slots, each slot representing a time period, wherein the first plurality of slots represent a first range of time periods and the second plurality of slots represent a second range of time periods, the first range being determined based on a number of slots in the first timer unit and a first granularity which defines a relationship between the first plurality of slots, the second range being determined based on a number of slots in the second timer unit and a second granularity which defines a relationship between the second plurality of slots; and
a timer logic module configured to;
receive counter information from a counter incrementing at predetermined time intervals, and
update at least one of the slots when the counter information corresponds to the time period represented by the at least one slot.

10. The system according to claim 9, wherein the time period is based on clock tick cycles of a device and the first granularity is one of one clock tick cycle, four clock tick cycles, sixteen clock tick cycles and sixty-four clock cycles.

11. The system according to claim 9, wherein a ratio between the first granularity and the second granularity is one of one to four and one to two.

12. The system according to claim 9, wherein the timer logic is further configured to select one of the first and second timer units into which a timeout setting is to be inserted by determining a maximum time period of the first timer unit based on a number of slots of the first plurality of slots and the first granularity, comparing the timeout setting to the maximum time period of the first timer unit, and selecting the first timer unit if the timeout setting is one of less than and equal to the maximum time period of the first timer unit.

13. The system according to claim 12, wherein, if the timeout setting is greater than the maximum time period of the first timer unit, the timer logic shifts a binary representation of the maximum time period of the first timer unit to the left to determine a maximum time period of the second timer unit, wherein a number of places to shift is based on a relationship between the first granularity and the second granularity.

14. The system according to claim 9, wherein a the timer logic is further configured to select one of the first plurality of slots into which a timeout setting is to be inserted.

15. The system according to claim 14, wherein the timer logic selects the one of the slots by determining an absolute slot value based on a value of the timeout setting and determining a relative slot value based on the absolute slot value and a current slot value.

16. The system according to claim 15, wherein the timer logic determines the absolute slot value by shifting a binary representation of the timeout setting to the right, a number of places to shift is based on a granularity which defines a relationship between the first plurality of slots.

17. A system, comprising:
- a first timer unit including a first plurality of slots, each slot representing a time period; and
- a second timer unit including a second plurality of slots, each slot representing a time period, wherein the first plurality of slots represent a first range of time periods and the second plurality of slots represent a second range of time periods, the first range being determined based on a number of slots in the first timer unit and a first granularity which defines a relationship between the first plurality of slots, the second range being determined based on a number of slots in the second timer unit and a second granularity which defines a relationship between the second plurality of slots,
- wherein the first range and the second range are related based on a ratio between the first granularity and the second granularity.

18. The system according to claim 17, wherein a timeout setting within the first range is inserted into one of the first plurality of slots.

19. The system according to claim 17, wherein a timeout setting within the second range is inserted into one of the second plurality of slots.

20. The system according to claim 17, wherein the ratio between the first granularity and the second granularity is one of one to four and one to two.

* * * * *